(12) United States Patent
Liu

(10) Patent No.: US 8,195,259 B2
(45) Date of Patent: Jun. 5, 2012

(54) ELECTRONIC DEVICE

(75) Inventor: Tai-Jun Liu, Shenzhen (CN)

(73) Assignees: Shenzhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 419 days.

(21) Appl. No.: 12/502,290

(22) Filed: Jul. 14, 2009

(65) Prior Publication Data

US 2010/0160007 A1    Jun. 24, 2010

(30) Foreign Application Priority Data

Dec. 22, 2008  (CN) .......................... 2008 1 0306416

(51) Int. Cl.
*H04M 1/00* (2006.01)

(52) U.S. Cl. .................. 455/575.8; 455/575.1; 455/347; 455/348

(58) Field of Classification Search .......... 455/347–349, 455/550.1, 575.1, 575.4, 575.8, 90.3; 361/616, 361/667, 724–727, 747, 769; 429/97, 100; 439/500
See application file for complete search history.

(56) References Cited

U.S. PATENT DOCUMENTS

| | | | | |
|---|---|---|---|---|
| 6,244,894 B1 * | 6/2001 | Miyashita | ..................... | 439/500 |
| 6,983,130 B2 * | 1/2006 | Chien et al. | .................. | 455/90.3 |
| 7,529,569 B2 * | 5/2009 | Ahn et al. | .................. | 455/575.1 |
| 7,635,535 B2 * | 12/2009 | Ebi et al. | .......................... | 429/96 |
| 7,702,372 B2 * | 4/2010 | Tu et al. | ..................... | 455/575.1 |
| 7,711,111 B2 * | 5/2010 | Chuang | ..................... | 379/433.11 |
| 7,796,381 B2 * | 9/2010 | Zuo et al. | ................. | 361/679.57 |
| 2003/0134602 A1 * | 7/2003 | Haga et al. | ...................... | 455/90 |
| 2004/0224221 A1 * | 11/2004 | Chen et al. | ...................... | 429/96 |
| 2004/0229114 A1 * | 11/2004 | Liang et al. | ..................... | 429/100 |
| 2005/0250532 A1 * | 11/2005 | Hwang et al. | ............. | 455/550.1 |
| 2006/0056617 A1 * | 3/2006 | Shiogama | ..................... | 379/440 |
| 2006/0126298 A1 * | 6/2006 | Liu et al. | ....................... | 361/700 |
| 2006/0175840 A1 * | 8/2006 | Wang et al. | ................... | 292/228 |
| 2006/0192525 A1 * | 8/2006 | Qin et al. | ......................... | 320/107 |
| 2006/0290686 A1 * | 12/2006 | Shimizu et al. | ................ | 345/179 |
| 2007/0026299 A1 * | 2/2007 | Park et al. | ........................ | 429/97 |
| 2007/0111086 A1 * | 5/2007 | Li et al. | ........................... | 429/97 |
| 2007/0117598 A1 * | 5/2007 | Yang et al. | ................. | 455/575.1 |
| 2007/0122693 A1 * | 5/2007 | Qin et al. | ......................... | 429/97 |
| 2007/0270194 A1 * | 11/2007 | Park | ........................... | 455/575.1 |
| 2008/0084994 A1 * | 4/2008 | Chuang | ..................... | 379/433.11 |
| 2008/0226970 A1 * | 9/2008 | Kim et al. | ....................... | 429/96 |
| 2008/0318646 A1 * | 12/2008 | Lin | ............................. | 455/575.4 |
| 2009/0291357 A1 * | 11/2009 | Hua | .............................. | 429/100 |
| 2010/0047677 A1 * | 2/2010 | Ornt | .............................. | 429/100 |
| 2010/0055550 A1 * | 3/2010 | Scott et al. | ..................... | 429/100 |

* cited by examiner

*Primary Examiner* — Dominic E Rego

(74) *Attorney, Agent, or Firm* — Altis Law Group, Inc.

(57) ABSTRACT

An electronic device includes a main body, a battery detachably received in the main body, a battery cover covering the battery, and a resilient member connecting the batter cover to the main body. The electronic device with the resilient member ensures the battery cover from losing from the main body.

18 Claims, 5 Drawing Sheets

ELECTRONIC DEVICE

BACKGROUND

1. Technical Field

The present disclosure generally relates to electronic device, and more particularly to an electronic device with a battery mounted thereon.

2. Description of Related Art

With the development of communication technology, more and more electronic devices, such as mobile phones and personal digital assistants (PDAs) are widely used.

The electronic device generally includes a main body and a battery cover detachably mounted therein. The battery cover is a separate component from the main body, thus the battery cover may be lost when not mounted to the main body.

Therefore, there is room for improvement within the art.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout several views, and all the views are schematic.

DETAILED DESCRIPTION

Figure 1:
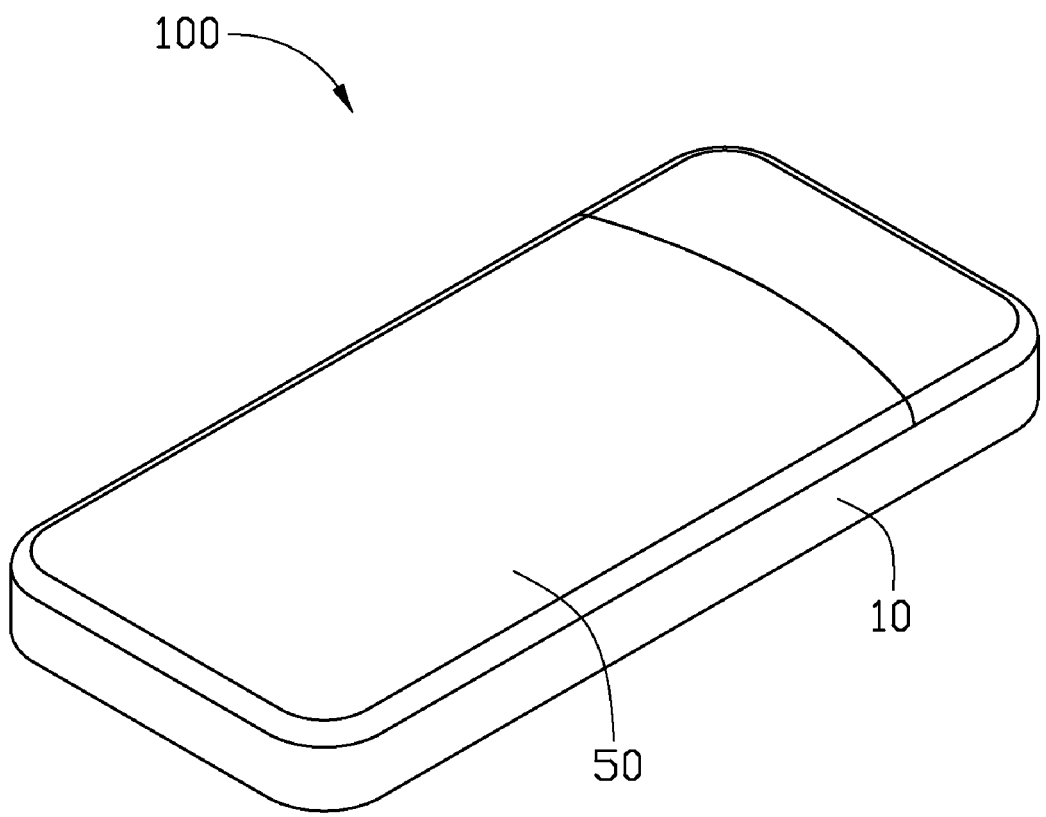
FIG. 1 is an assembled, isometric view of an exemplary embodiment of an electronic device.
Figure 2:
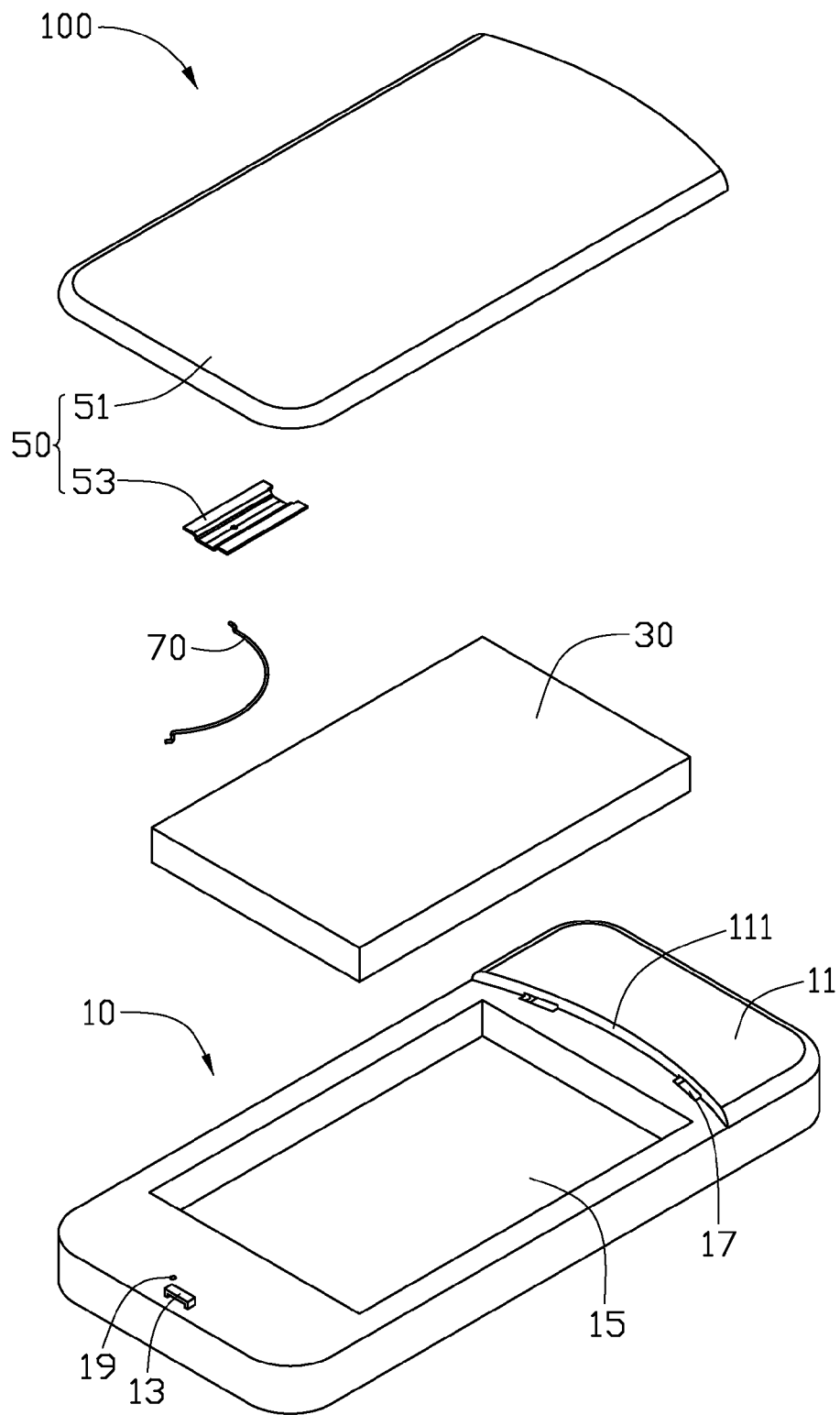
FIG. 2 is an exploded, isometric view of the electronic device of FIG. 2.

The present disclosure of an electronic device may be a mobile phone, a PDA and etc. Referring to FIG. 1 and FIG. 2, an electronic device 100 includes a main body 10, a battery 30 received in the main body 10, a battery cover 50 covering the battery 30, and a spring 70 connecting the battery cover 50 to the main body 10.

The main body 10 forms a limiting portion 11 and a limiting protrusion 13 at opposite ends of the main body 10. The limiting portion 11 has a curved sidewall 111. The main body 10 defines a receptacle 15 between the limiting portion 11 and the limiting protrusion 13, two latching grooves 17 adjacent to the sidewall 111, and a positioning hole 19 adjacent to the limiting protrusion 13. The positioning hole 19 communicates with inside of the main body 10.

The battery 30 is rectangular and received in the receptacle 15 of the main body 10.

Figure 3:
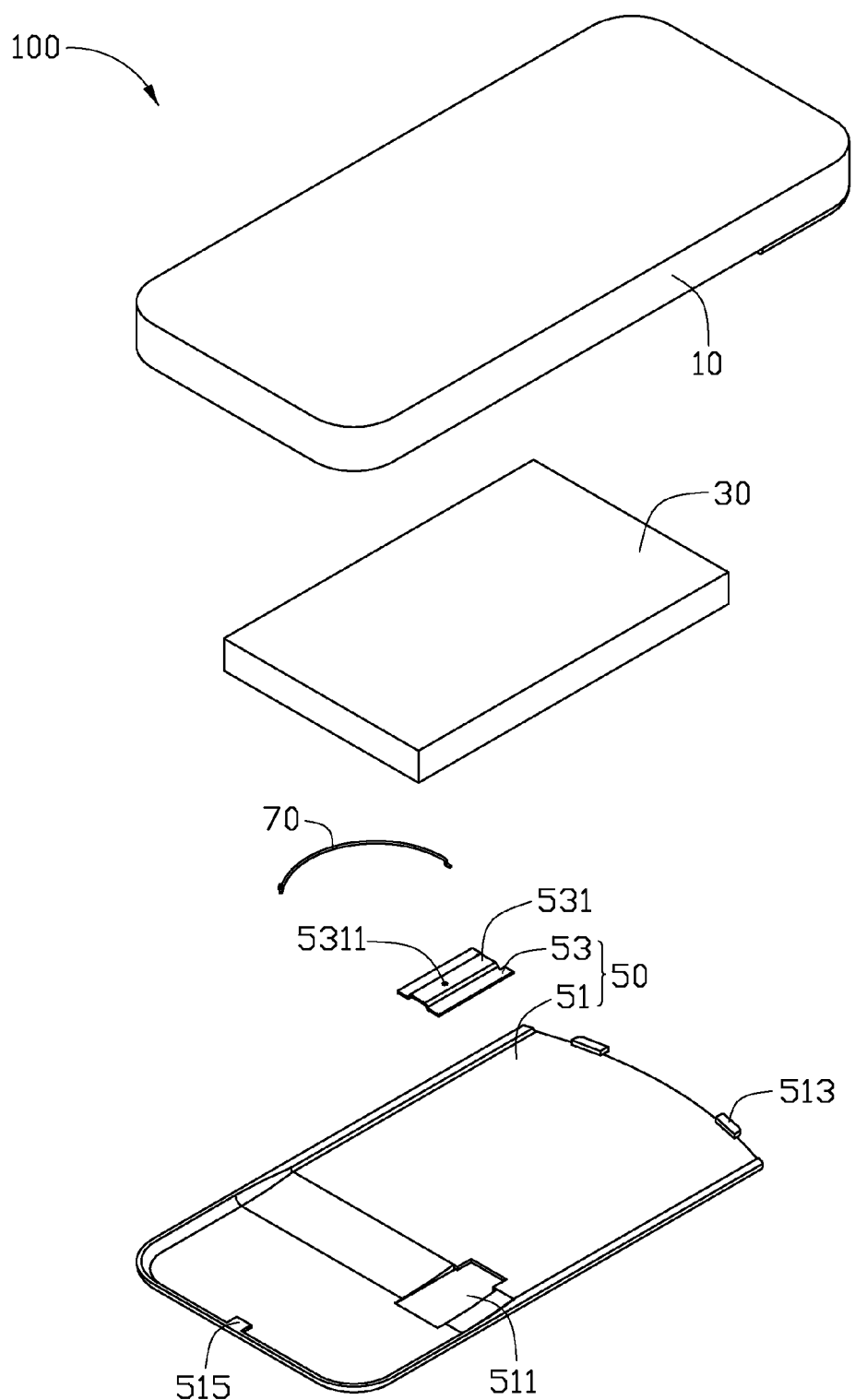
FIG. 3 is similar to FIG. 2, but viewed from another aspect.

Referring to FIG. 3, the battery cover 50 includes a base 51 and a fixing member 53 fixed on the base 51.

The base 51 defines a recess 511 to receive the fixing member 53. The base 51 further forms two first locking protrusions 513 and a second locking protrusion 515 extending towards the first locking protrusions 513. The first locking protrusions 513 extend from an edge of the base 51, and the second locking protrusion 515 extends from an opposite edge of the base 51. The recess 511 is defined between the first locking protrusions 513 and the second locking protrusion 515. The edge forming the first locking protrusions 513 is curved correspondingly to the sidewall 111 of the limiting portion 11 of the main body 10.s The fixing member 53 is bent and forms a bulge 531, having a fixing hole 5311. When the fixing member 53 is received in the recess 511, the bulge 531 and the base 51 together form a cavity (not labeled) therebetween.

Figure 4:
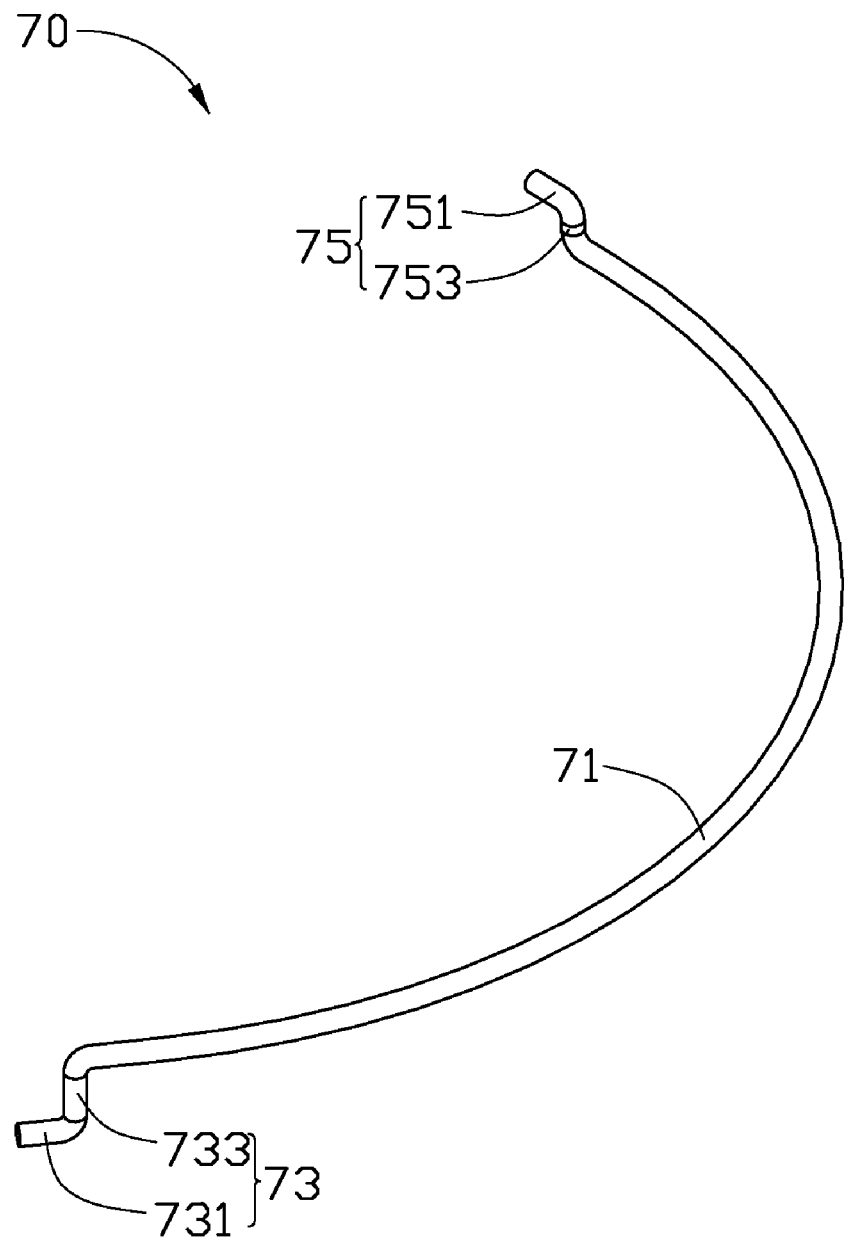
FIG. 4 is an isometric view of the spring of the electronic device in FIG. 1 including a spring.

Referring to FIGS. 2 through 4, a resilient member, for example, the spring 70 includes an arcuate part 71, a first connecting portion 73, and a second connecting portion 75. The first connecting portion 73 includes a first hook 731 and a first bent portion 733 connecting the first hook 731 to the arcuate part 71. The second connecting portion 75 includes a second hook 751 and a second bent portion 753 connecting the second hook 751 to the second bent portion 753. The first hook 731 of the first connecting portion 73 extends into inside of the main body 10 via the first positioning hole 19, and the first bent portion 733 is rotatably received in the first positioning hole 19. The second hook 751 of the second connecting portion 75 extends into the cavity of the battery cover 50 through the fixing member 53, and the second bent portion 753 is rotatably received in the fixing hole 5311.

Figure 5:
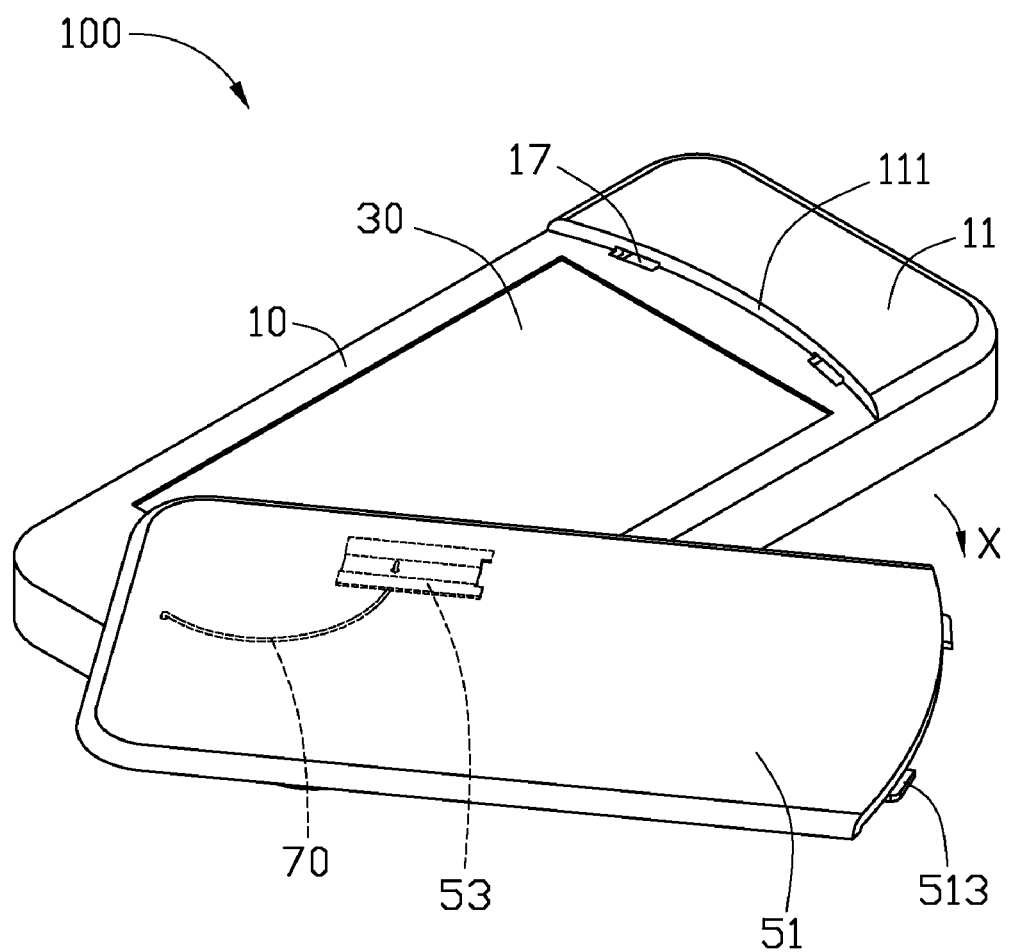
FIG. 5 is an isometric view of the electronic device, and showing an unlocked position of the battery cover.

Also referring to FIG. 5, in use, when the battery 30 is received in the receptacle 15 of the main body 10, the battery cover 50 covers the battery 30, the first locking protrusions 513 engage the latching grooves 17, the second locking protrusion 515 engages the limiting protrusion 13. In this state, the spring 70 is compressed, and the curvature of the spring 70 increases. Therefore, the spring 70 applies a push force on the battery cover 50 which is in a direction from the second locking protrusion 515 to the first locking protrusions 513. The push force ensures that the battery cover 50 covers the battery 30 and locks with the main body 10 tightly.

When removing the battery 30 from the main body 10, the battery cover 50 is pushed to make the first locking protrusions 513 disengage from the latching grooves 17 and make the second locking protrusion 515 disengage from the limiting protrusion 13. The battery cover 50 may be rotated around the first bent portion 733 of the spring 70 and along the direction "X" through 180 degrees or other degrees to expose the battery 30. When stopping pushing the battery cover 50, the spring 70 gradually rebounds to natural state. The battery cover 50 rotates along a direction reverse to the direction "X" to be locked to the main body 10 again. The spring 70 is compressed again.

In the electronic device 100, the battery cover 50 is fixedly connected to the main body 10 by the spring 70, therefore, the battery cover 50 may not be lost. The elastic force of the spring 70 may push the battery cover 50, such that the battery cover 50 may be locked to the main body 10 tightly.

In alternative embodiments, the first connecting portion 73 of the spring 70 may connects to the portion adjacent to the limiting portion 11 of the main body 10, so when the battery cover 50 is locked to the main body 10, the spring 70 acts a pull force on the battery cover 50. The spring 70 may be other resilient member, such as compression coil spring, elastic piece and etc. The first locking protrusions 513 and the second locking protrusion 515 on the battery cover 50 may be omitted and instead by other locking portions. For example, the battery cover 50 may defines two first locking grooves and a second locking groove in opposite edges. Correspondingly, the latching grooves 17 and the limiting protrusion 13 may be protrusions instead. The number of the latching grooves 17 may be not two, instead, for example, one, three, etc. Correspondingly, the first locking portions 513 may be formed on the battery cover 50 in the same number.

Finally, while various embodiments have been described and illustrated, the disclosure is not to be construed as being limited thereto. Various modifications can be made to the embodiments by those skilled in the art without departing from the true spirit and scope of the disclosure as defined by the appended claims.

What is claimed is:

1. An electronic device, comprising:
a main body including a first planar surface;
a battery receptacle in the first planar surface of the main body;
a battery cover comprising a second planar surface, at least one locking portion and covering the battery receptacle, the first and second planar surfaces being parallel to each other at all times; and
a resilient member including a first connecting portion and a second connecting portion non-coaxially positioned relative each other, the first connecting portion rotatable and directly connecting with the main body, and the second connecting portion directly connecting with the battery cover;
wherein when the second surface of the battery cover covers the battery receptacle, the resilient member is deformed and generates a resilient force which pushes the battery cover to make the at least one locking portion of the battery cover lock to the main body, when the battery cover is rotated on the main body along the first connecting portion of the resilient member, the second surface offsets relative to the first surface to expose the battery receptacle.

2. The electronic device of claim 1, wherein the resilient member is a spring.

3. The electronic device of claim 1, wherein the resilient member comprises an arcuate part, the first connecting portion connecting to an end of the arcuate part, and the second connecting portion connecting to an opposite end of the arcuate part.

4. The electronic device of claim 3, wherein the first connecting portion comprises a first hook and a first bent portion connecting the first hook to the arcuate part, the second connecting portion comprises a second hook and a second bent portion connecting the second hook to the arcuate part.

5. The electronic device of claim 4, wherein the battery cover comprises a base and a fixing member fixed thereon, and the second connecting portion of the resilient member connects with the fixing member.

6. The electronic device of claim 4, wherein the main body forms a limiting portion at an end of the main body, and the limiting portion defines at least one latching groove, the at least one locking portion of the battery cover comprises at least one first locking protrusion engaging the at least one latching groove.

7. The electronic device of claim 6, wherein the first connecting portion of the resilient member connects to an end away from the limiting portion of the main body.

8. The electronic device of claim 6, wherein the main body further comprises a limiting protrusion away from the at least one latching groove, and the battery cover comprises a second locking protrusion engaging with the limiting protrusion correspondingly, the second locking protrusion and the at least one first locking protrusion are formed on two opposite edges of the battery cover.

9. The electronic device of claim 6, wherein the limiting portion has a curved sidewall, and the battery cover has a curved edge on which the at least one first locking protrusion is formed correspondingly.

10. The electronic device of claim 1, wherein the battery cover is rotatably connected to an end of the main body.

11. An electronic device, comprising:
a main body defining a receptacle;
a battery cover; and
a resilient member comprising an arcuate part, a first connecting portion connecting the main body, and a second connecting portion connecting the battery cover, wherein the first connecting portion comprises a first hook and a first bent portion connecting the first hook to the arcuate part, the second connecting portion comprises a second hook and a second bent portion connecting the second hook to the arcuate part;
wherein the battery cover and the main body are connected by the resilient member, and the resilient member actuates the battery cover locking with the main body.

12. The electronic device of claim 11, wherein the resilient member is a spring.

13. The electronic device of claim 11, wherein the main body defines a positioning hole, the first hook extends into inside of the main body via the positioning hole, and the first bent portion is received in the hole.

14. The electronic device of claim 13, wherein the main body forms a limiting portion, and the first connecting portion connects to an end of the main body away from the limiting portion.

15. The electronic device of claim 11, wherein the battery cover comprises a base and a fixing member fixed on the base, and the second connecting portion of the spring connects to the fixing member.

16. The electronic device of claim 11, wherein the main body defines at least one latching groove, and the battery cover forms at least one first locking protrusion engaging the at least one latching groove.

17. The electronic device of claim 16, wherein the main body further defines a limiting protrusion away from the at least one latching groove, and the battery cover forms a second locking protrusion which is away from the at least one first locking protrusion and locks with the limiting protrusion.

18. The electronic device of claim 11, wherein the battery cover is rotatably connected to an end of the main body.

* * * * *